(12) United States Patent
Li

(10) Patent No.: US 12,701,453 B2
(45) Date of Patent: Aug. 4, 2026

(54) METHOD AND APPARATUS FOR DETERMINING SERVICE PARTICIPATION, NETWORK ELEMENT DEVICE, USER EQUIPMENT, AND STORAGE MEDIUM

(71) Applicant: Beijing Xiaomi Mobile Software Co., Ltd., Beijing (CN)

(72) Inventor: Yanhua Li, Beijing (CN)

(73) Assignee: BEIJING XIAOMI MOBILE SOFTWARE CO., LTD, Beijing (CN)

( * ) Notice: Subject to any disclaimer, the term of this patent is extended or adjusted under 35 U.S.C. 154(b) by 391 days.

(21) Appl. No.: 18/031,754

(22) PCT Filed: Oct. 15, 2020

(86) PCT No.: PCT/CN2020/121325
§ 371 (c)(1),
(2) Date: Apr. 13, 2023

(87) PCT Pub. No.: WO2022/077400
PCT Pub. Date: Apr. 21, 2022

(65) Prior Publication Data
US 2023/0413101 A1     Dec. 21, 2023

(51) Int. Cl.
*H04W 28/02*     (2009.01)
*H04W 72/51*     (2023.01)
(52) U.S. Cl.
CPC ... *H04W 28/0236* (2013.01); *H04W 28/0215* (2013.01); *H04W 72/51* (2023.01)
(58) Field of Classification Search
CPC ............. H04W 24/10; H04W 28/0236; H04W 28/0215; H04W 72/51; H04W 52/241; H04W 24/02; H04W 72/54; H04W 72/542; H04W 48/16; G06Q 30/00
USPC ....... 370/252, 329, 235, 254, 315, 328, 331, 370/335, 338; 455/446, 422.1, 452.2, 455/450, 464, 509
See application file for complete search history.

(56) References Cited

U.S. PATENT DOCUMENTS

| | | | | |
|---|---|---|---|---|
| 2004/0146041 | A1* | 7/2004 | Lee | H04J 3/245 |
| | | | | 455/526 |
| 2004/0225657 | A1* | 11/2004 | Sarkar | G06Q 10/06 |
| | | | | 707/999.009 |
| 2013/0083726 | A1* | 4/2013 | Jain | H04W 28/0289 |
| | | | | 370/328 |
| 2016/0128116 | A1* | 5/2016 | Kim | H04W 4/021 |
| | | | | 370/329 |

(Continued)

FOREIGN PATENT DOCUMENTS

| | | |
|---|---|---|
| CN | 101784035 A | 7/2010 |
| CN | 102083112 A | 6/2011 |

(Continued)

*Primary Examiner* — Ricardo H Castaneyra
(74) *Attorney, Agent, or Firm* — Volpe Koenig

(57) ABSTRACT
A method for determining service participation, includes: a first network element device obtaining associated information of indicated service of a user equipment (UE), and determining a UE that is suitable for participating in the indicated service and/or a UE that is not suitable for participating in the indicated service; and sending information of the determined UE that is suitable for participating in the indicated service and/or UE that is not suitable for participating in the indicated service to a second network element device.

20 Claims, 3 Drawing Sheets

---

Obtain, by a first network element device, associated information about an indicated service of user equipment (UE) — 201

Transmit indication information associated with UE suitable for participating in the indicated service and/or UE unsuitable for participating in the indicated service to a second network element device — 202

(56) References Cited

U.S. PATENT DOCUMENTS

| 2020/0236148 A1* | 7/2020 | Afzal | H04L 65/1045 |
| 2021/0216664 A1* | 7/2021 | Zhang | G06F 21/6218 |
| 2022/0225058 A1* | 7/2022 | Xiong | H04W 76/40 |
| 2023/0189319 A1* | 6/2023 | Akdeniz | G06N 3/084 |
| | | | 370/329 |

FOREIGN PATENT DOCUMENTS

| CN | 107862473 A | 3/2018 |
| CN | 108430058 A | 8/2018 |
| CN | 109600721 A | 4/2019 |
| CN | 109615423 A | 4/2019 |
| CN | 111447608 A | 7/2020 |

* cited by examiner

| | 201 |
|---|---|
| Obtain, by a first network element device, associated information about an indicated service of user equipment (UE) | |

| | 202 |
|---|---|
| Transmit indication information associated with UE suitable for participating in the indicated service and/or UE unsuitable for participating in the indicated service to a second network element device | |

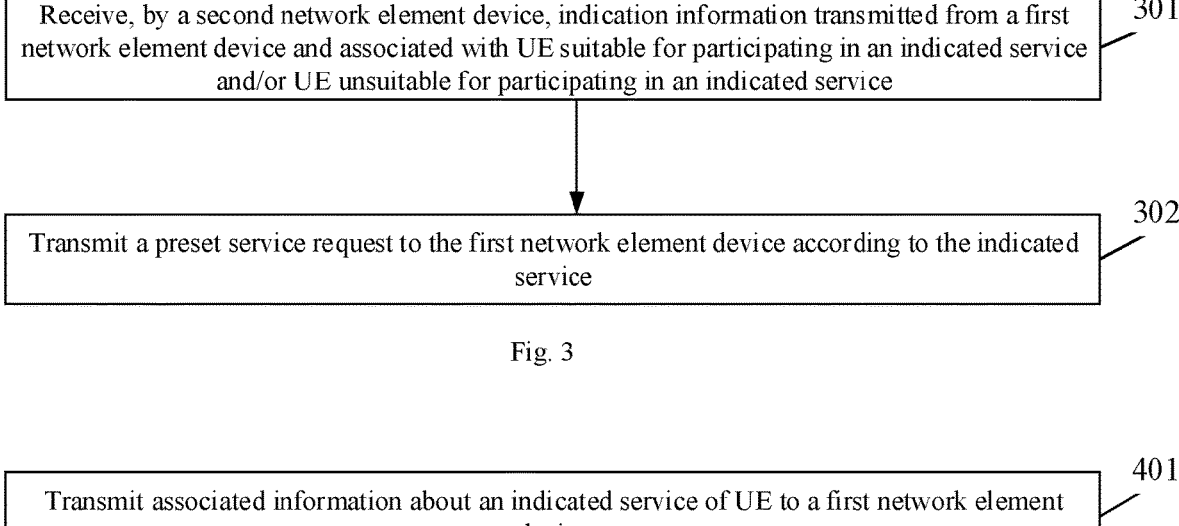

Receive, by a second network element device, indication information transmitted from a first network element device and associated with UE suitable for participating in an indicated service and/or UE unsuitable for participating in an indicated service — 301

Transmit a preset service request to the first network element device according to the indicated service — 302

Fig. 3

Transmit associated information about an indicated service of UE to a first network element device — 401

Fig. 4

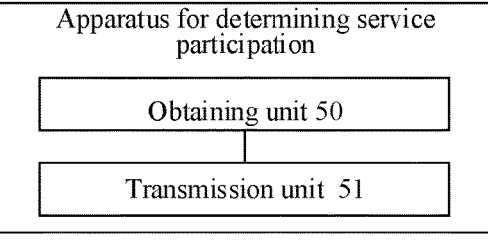

Apparatus for determining service participation

Obtaining unit 50

Transmission unit 51

Fig. 5

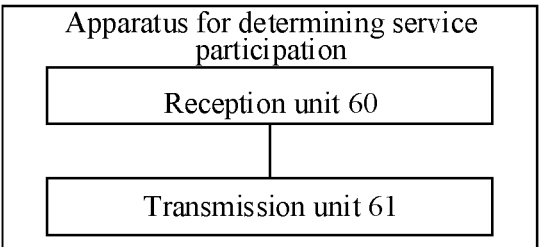
Fig. 6
Fig. 7
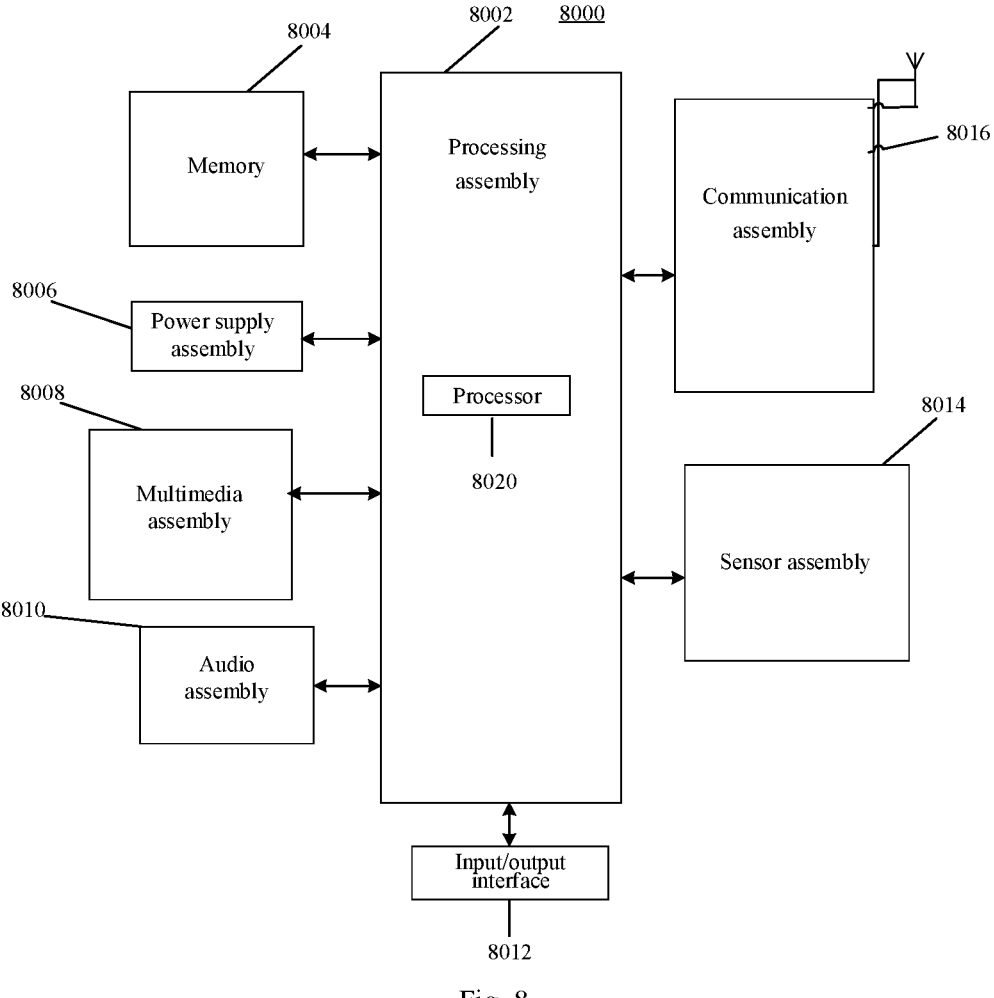
Fig. 8

METHOD AND APPARATUS FOR DETERMINING SERVICE PARTICIPATION, NETWORK ELEMENT DEVICE, USER EQUIPMENT, AND STORAGE MEDIUM

CROSS REFERENCE TO RELATED APPLICATION

The present application is a U.S. National Stage of International Application No. PCT/CN2020/121325, filed on Oct. 15, 2020, the contents of all of which are incorporated herein by reference in their entirety for all purposes.

SUMMARY

According to a first aspect of the examples of the disclosure, there is provided a method for determining service participation. The method includes: obtaining, by a first network element device, associated information about an indicated service of UE, where the associated information about the indicated service is configured to determine UE suitable for participating in the indicated service and/or UE unsuitable for participating in the indicated service; and transmitting indication information associated with the UE suitable for participating in the indicated service and/or the UE unsuitable for participating in the indicated service to a second network element device.

According to a second aspect of the examples of the disclosure, there is provided a method for determining service participation. The method includes: receiving, by a second network element device, indication information transmitted from a first network element device and associated with UE suitable for participating in an indicated service and/or UE unsuitable for participating in an indicated service; and transmitting an indicated service request to the first network element device according to the indicated service.

According to a third aspect of the examples of the disclosure, there is provided a method for determining service participation. The method is performed by UE and includes: transmitting associated information about an indicated service of the UE to a first network element device, where the associated information about the indicated service is configured to determine whether the UE is suitable for participating in the indicated service and/or the UE is unsuitable for participating in the indicated service.

According to a fourth aspect of the examples of the disclosure, there is provided a network element device. The network element device includes a processor, a transceiver, a memory, and an executable program stored in the memory and runnable by the processor, where the processor executes the steps of the method for determining service participation according to the first aspect of the examples of the disclosure when running the executable program.

According to a fifth aspect of the examples of the disclosure, there is provided a network element device. The network element device includes a processor, a transceiver, a memory, and an executable program stored in the memory and runnable by the processor, where the processor executes the steps of the method for determining service participation according to the second aspect of the examples of the disclosure when running the executable program.

According to a sixth aspect of the examples of the disclosure, there is provided a user equipment. The user equipment includes a processor, a transceiver, a memory, and an executable program stored in the memory and runnable by the processor, where the processor executes the steps of the method for determining service participation according to the third aspect of the examples of the disclosure when running the executable program.

According to a seventh aspect of the examples of the disclosure, there is provided a non-transitory computer-readable storage medium. The storage medium stores an executable program, where the executable program executes the steps of the above method for determining service participation when being executed by a processor.

BRIEF DESCRIPTION OF THE DRAWINGS

The drawings here are incorporated into the description as a constituent part of the description, illustrate examples conforming to the disclosure, and serve to explain principles of the examples of the disclosure along with the description.

FIG. 3 is a schematic flow diagram of a method for determining service participation according to an example.

FIG. 4 is a schematic flow diagram of a method for determining service participation according to an example.

FIG. 5 is a schematic structural diagram of the composition of an apparatus for determining service participation according to an example.

FIG. 6 is a schematic structural diagram of the composition of an apparatus for determining service participation according to an example.

FIG. 7 is a schematic structural diagram of the composition of an apparatus for determining service participation according to an example.

FIG. 8 is a schematic structural diagram of the composition of user equipment according to an example.

DETAILED DESCRIPTION

Figures 1, 2:
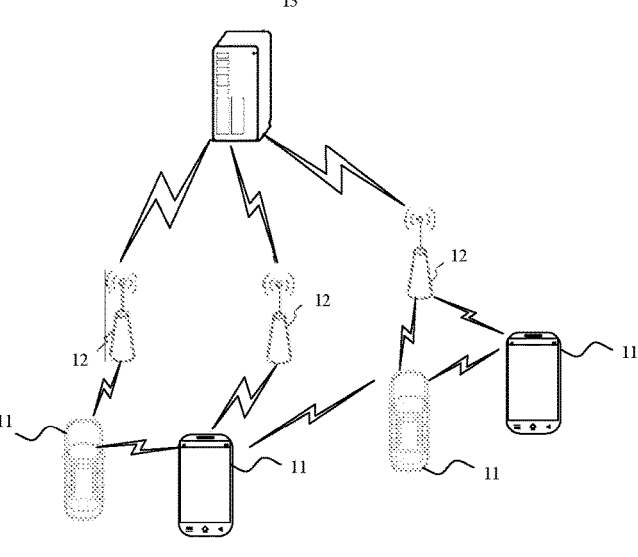
FIG. 1 is a schematic structural diagram of a radio communication system according to an example.
FIG. 2 is a schematic flow diagram of a method for determining service participation according to an example.

Examples will be described in detail here and shown in the accompanying drawings illustratively. When the following descriptions involve the accompanying drawings, unless otherwise specified, the same numeral in different accompanying drawings denotes the same or similar elements. The embodiments described in the following examples do not denote all embodiments consistent with the examples of the disclosure. On the contrary, the embodiments are merely examples of an apparatus and a method consistent with some aspects of the examples of the disclosure as detailed in the appended claims.

The terms used in the examples of the disclosure are merely to describe the specific examples, instead of limiting the examples of the disclosure. The singular forms such as "a," "an," "the," and "this" used in the examples of the disclosure and the appended claims are also intended to include the plural forms, unless otherwise clearly stated in the context. It is further to be understood that the term "and/or" used here refers to and includes any of one or more of the associated listed items or all possible combinations.

It is to be understood that although the terms such as first, second, and third may be used to describe various information in the examples of the disclosure, the information is not intended to be limited to the terms. The terms are merely used to distinguish the same type of information from each other. For example, without departing from the scope of the examples of the disclosure, first information can also be called second information, and similarly, second information can also be called first information. Depending on the context, the word "if" used here can be interpreted as "when," or "at the time of," or "in response to determining."

The disclosure relates to a method and apparatus for determining service participation, a network element device, user equipment (UE), and a storage medium.

The network connection technology in development has boosted the emergence of networking collaborative services. Collaborative services require data to be shared and flow between nodes. However, some nodes with a low computing power or in a poor communication link lead to deviation and even training failure of a collaborative model. In order to avoid failure of the collaborative services, it's necessary to consider the selection of participants conducting the collaborative services. Further, it's crucial to obtain statistical data on participation in the collaborative services from information about participating terminals.

In view of this, examples of the disclosure provide a method and apparatus for determining service participation, as well as a network element device, user equipment (UE), and a storage medium.

According to a first aspect of the examples of the disclosure, there is provided a method for determining service participation. The method includes: obtaining, by a first network element device, associated information about an indicated service of UE, where the associated information about the indicated service is configured to determine UE suitable for participating in the indicated service and/or UE unsuitable for participating in the indicated service; and transmitting indication information associated with the UE suitable for participating in the indicated service and/or the UE unsuitable for participating in the indicated service to a second network element device.

In some examples, the method includes: determining, based on the associated information about the indicated service of the UE, the indication information associated with the UE suitable for participating in the indicated service and/or the UE unsuitable for participating in the indicated service.

In some examples, the associated information about the indicated service of the UE includes auxiliary information provided by the UE, and the auxiliary information includes at least one of: radio capability information of the UE, computing power information of the UE, or request information that the UE expects to participate in the indicated service or not.

In some examples, the associated information about the indicated service of the UE indicates that the UE is suitable for participating in the indicated service and/or unsuitable for participating in the indicated service, and the transmitting indication information associated with the UE suitable for participating in the indicated service and/or the UE unsuitable for participating in the indicated service to a second network element device includes: transmitting the associated information about the indicated service of the UE to the second network element device.

In some examples, transmitting indication information associated with the UE suitable for participating in the indicated service and/or the UE unsuitable for participating in the indicated service to a second network element device includes:

inserting, by the first network element device, the indication information associated with the UE suitable for participating in the indicated service and/or the UE unsuitable for participating in the indicated service into a resource release message transmitted to the second network element device when the UE releases a radio resource.

In some examples, transmitting indication information associated with the UE suitable for participating in the indicated service and/or the UE unsuitable for participating in the indicated service to a second network element device includes:

transmitting the indication information associated with the UE determined as suitable for participating in the indicated service and/or the UE determined as unsuitable for participating in the indicated service to the second network element device, in response to determining that the first network element device receives a request transmitted from the second network element device for obtaining information of the UE participating in the indicated service.

In some examples, transmitting indication information associated with the UE suitable for participating in the indicated service and/or the UE unsuitable for participating in the indicated service to a second network element device includes: in response to a transmission period configuration, periodically transmitting, by the first network element device, the indication information associated with the UE determined as suitable for participating in the indicated service and/or the UE determined as unsuitable for participating in the indicated service to the second network element device.

In some examples, the transmitting indication information associated with the UE suitable for participating in the indicated service and/or the UE unsuitable for participating in the indicated service to a second network element device includes: detecting an indicated event by the first network element device, and transmitting, in response to detecting the indicated event, the indication information associated with the UE determined as suitable for participating in the indicated service and/or the UE determined as unsuitable for participating in the indicated service to the second network element device.

In some examples, the first network element device receives information on the UE determined by the second network element device as suitable for participating in the indicated service.

In some examples, the method further includes: receiving, by the first network element device, an indicated service creation request transmitted from the second network element device, feeding a service creation success response back to the second network element device in response to determining that the UE involved in the indicated service creation request is the UE suitable for participating in the indicated service and is in a connected state, or, feeding a service creation failure response back to the second network element device in response to determining that the UE involved in the indicated service creation request is the UE unsuitable for participating in the indicated service and is in a connected state.

In some examples, the method further includes: receiving, by the first network element device, an indicated service creation request transmitted from the second network element device, paging, in response to determining that the UE involved in the indicated service creation request is the UE suitable for participating in the indicated service and is in an idle state, the UE, or, transmitting a paging failure response to the second network element device in response to determining that the UE involved in the indicated service creation request is the UE unsuitable for participating in the indicated service and is in an idle state.

In some examples, the indicated service includes a federated learning service.

According to a second aspect of the examples of the disclosure, there is provided a method for determining service participation. The method includes: receiving, by a second network element device, indication information transmitted from a first network element device and associated with UE suitable for participating in an indicated service and/or UE unsuitable for participating in an indicated service; and transmitting an indicated service request to the first network element device according to the indicated service.

In some examples, the indicated service request includes associated information of the UE determined by the second network element device based on the indication information associated with the UE suitable for participating in the indicated service and/or the UE unsuitable for participating in the indicated service.

In some examples, the method further includes: receiving a response message transmitted from the first network element device and responding to the indicated service request, where the response message includes a result of the indicated service.

In some examples, the method further includes: transmitting, by the second network element device, reporting indication information of the UE suitable for participating in the indicated service and/or the UE unsuitable for participating in the indicated service to the first network element device, where the reporting indication information includes a reporting period or an event satisfying a reporting condition.

According to a third aspect of the examples of the disclosure, there is provided a method for determining service participation. The method is performed by UE and includes: transmitting associated information about an indicated service of the UE to a first network element device, where the associated information about the indicated service is configured to determine UE suitable for participating in the indicated service and/or UE unsuitable for participating in the indicated service.

In some examples, transmitting associated information about an indicated service of the UE to a first network element device responds to reporting indication information of the associated information about the indicated service from the first network element device.

In some examples, the associated information about the indicated service of the UE includes auxiliary information provided by the UE, and the auxiliary information includes at least one of: radio capability information of the UE, computing power information of the UE, or request information that the UE expects to participate in the indicated service or not.

In some examples, the method further includes: determining whether the UE is suitable for participating in the indicated service based on the radio capability information of the UE and/or the computing power information of the UE; and transmitting the associated information about the indicated service of the UE to the first network element device in response to determining that the UE is suitable for participating in the indicated service, where the associated information about the indicated service of the UE indicates that the UE is suitable for participating in the indicated service and/or unsuitable for participating in the indicated service.

According to a fourth aspect of the examples of the disclosure, there is provided an apparatus for determining service participation. The apparatus is applied to a first network element device and includes: an obtaining unit configured to obtain associated information about an indicated service, where the associated information about the indicated service is configured to determine a UE suitable for participating in the indicated service and/or a UE unsuitable for participating in the indicated service; and a transmission unit configured to transmit indication information associated with the UE suitable for participating in the indicated service and/or the UE unsuitable for participating in the indicated service to a second network element device.

In some examples, the apparatus includes: a determination unit configured to determine, based on the associated information about the indicated service of the UE, the indication information associated with the UE suitable for participating in the indicated service and/or the UE unsuitable for participating in the indicated service.

In some examples, the associated information about the indicated service of the UE includes auxiliary information provided by the UE, and the auxiliary information includes at least one of: radio capability information of the UE, computing power information of the UE, or request information that the UE expects to participate in the indicated service or not.

In some examples, the associated information about the indicated service of the UE indicates that the UE is suitable for participating in the indicated service and/or unsuitable for participating in the indicated service, and the transmission unit is further configured to transmit the associated information about the indicated service of the UE to the second network element device.

In some examples, the transmission unit is further configured to: insert the indication information associated with the UE suitable for participating in the indicated service and/or the UE unsuitable for participating in the indicated service into a resource release message transmitted to the second network element device when the UE releases a radio resource.

In some examples, the apparatus further includes: a first reception unit configured to receive a request transmitted from the second network element device for obtaining information on the UE participating in the indicated service.

The transmission unit is further configured to transmit the indication information associated with the UE determined as suitable for participating in the indicated service and/or the UE determined as unsuitable for participating in the indicated service to the second network element device in response to the request from the second network element device.

In some examples, the transmission unit is further configured to periodically transmit, in response to a transmission period configuration, the indication information associated with the UE is determined as suitable for participating in the indicated service, and/or the UE is determined as unsuitable for participating in the indicated service to the second network element device.

In some examples, the apparatus further includes: a detection unit configured to detect an indicated event.

The transmission unit is further configured to transmit, in response to detecting the indicated event, the indication information associated with the UE determined as suitable for participating in the indicated service and/or the UE determined as unsuitable for participating in the indicated service to the second network element device.

In some examples, the apparatus further includes: a second reception unit configured to receive information of the UE determined by the second network element device as suitable for participating in the indicated service.

In some examples, the apparatus further includes: a third reception unit further configured to receive an indicated service creation request transmitted from the second network element device.

The determination unit is further configured to trigger the transmission unit to feed a service creation success response back to the second network element device in response to determining that the UE involved in the indicated service creation request is the UE suitable for participating in the indicated service and is in a connected state, or, feed a service creation failure response back to the second network element device in response to determining that the UE involved in the indicated service creation request is the UE unsuitable for participating in the indicated service and is in a connected state.

In some examples, the apparatus further includes: a fourth reception unit further configured to receive an indicated service creation request transmitted from the second network element device.

The determination unit is further configured to trigger, in response to determining that the UE involved in the indicated service creation request is the UE suitable for participating in the indicated service and is in an idle state, the transmission unit to page the UE, or, transmit a paging failure response to the second network element device in response to determining that the UE involved in the indicated service creation request is the UE unsuitable for participating in the indicated service and is in an idle state.

In some examples, the indicated service includes a federated learning service.

According to a fifth aspect of the examples of the disclosure, there is provided an apparatus for determining service participation. The apparatus includes: a reception unit configured to receive indication information transmitted from a first network element device and associated with UE suitable for participating in an indicated service and/or UE unsuitable for participating in an indicated service; and a transmission unit configured to transmit an indicated service request to the first network element device according to the indicated service.

In some examples, the indicated service request includes associated information of the UE determined by the second network element device based on the indication information associated with the UE suitable for participating in the indicated service and/or the UE unsuitable for participating in the indicated service.

In some examples, the reception unit is further configured to: receive a response message transmitted from the first network element device and responding to the indicated service request, where the response message includes a result of the indicated service.

In some examples, the transmission unit is configured to: transmit reporting indication information of the UE suitable for participating in the indicated service and/or the UE unsuitable for participating in the indicated service to the first network element device, where the reporting indication information includes a reporting period or an event satisfying a reporting condition.

According to a sixth aspect of the examples of the disclosure, there is provided an apparatus for determining service participation. The apparatus is applied to the UE and includes: a transmission unit configured to transmit associated information about an indicated service of the UE to a first network element device, where the associated information about the indicated service is configured to determine UE suitable for participating in the indicated service and/or UE unsuitable for participating in the indicated service.

In some examples, the transmission unit transmits the associated information about the indicated service of the UE to the first network element device in response to reporting indication information of the associated information about the indicated service from the first network element device.

In some examples, the associated information about the indicated service of the UE includes auxiliary information provided by the UE, and the auxiliary information includes at least one of: radio capability information of the UE, computing power information of the UE, or request information that the UE expects to participate in the indicated service or not.

In some examples, the apparatus further includes: a determination unit configured to determine whether the UE is suitable for participating in the indicated service based on the radio capability information of the UE and/or the computing power information of the UE.

The transmission unit is further configured to transmit the associated information about the indicated service of the UE to the first network element device in response to determining that the UE is suitable for participating in the indicated service, where the associated information about the indicated service of the UE indicates that the UE is suitable for participating in the indicated service and/or unsuitable for participating in the indicated service.

According to a seventh aspect of the examples of the disclosure, there is provided a network element device. The network element device includes a processor, a transceiver, a memory, and an executable program stored in the memory and runnable by the processor, where the processor executes the steps of the method for determining service participation according to the first aspect of the examples of the disclosure when running the executable program.

According to an eighth aspect of the examples of the disclosure, there is provided a network element device. The network element device includes a processor, a transceiver, a memory, and an executable program stored in the memory and runnable by the processor, where the processor executes the steps of the method for determining service participation according to the second aspect of the examples of the disclosure when running the executable program.

According to a ninth aspect of the examples of the disclosure, there is provided a user equipment. The user equipment includes a processor, a transceiver, a memory, and an executable program stored in the memory and runnable by the processor, where the processor executes the steps of the method for determining service participation according to the third aspect of the examples of the disclosure when running the executable program.

According to a tenth aspect of the examples of the disclosure, there is provided a non-transitory computer-readable storage medium. The storage medium stores an executable program, where the executable program executes the steps of the above method for determining service participation when being executed by a processor.

According to the method and apparatus for determining service participation, the network element device, the user equipment, and the storage medium of the examples of the disclosure, a first network element device, such as a base station, determines UE participating in the indicated service and UE not participating in the indicated service, informs a core network device of the UE participating in the indicated service and/or the UE not participating in the indicated service, and may receive the UE participating in the indicated service, the UE being determined by a core network. In this way, in response to determining whether the first network element device receives the indicated service request initiated by the UE, the first network element device may determine whether to make the UE access a current service according to a list of UE capable of participating in the indicated service, the list being transmitted from the core network device, and alternatively, the first network element device may jointly determine whether to make UE having a request to participate in the indicated service access the current indicated service based on a list of UE capable of participating in the indicated service and a list of UE determined to be capable of participating in the indicated service, the lists being transmitted from the core network device. The examples of the disclosure avoid training failure of a collaborative model of a collaborative service caused by poor communication quality or poor computing power of the UE, ensure smooth conduction and smooth operation of the entire collaborative service, and ensure smoothness of service conduction.

FIG. 1 shows a schematic structural diagram of a radio communication system provided in an example of the disclosure. As shown in FIG. 1, the radio communication system is a communication system based on cellular mobile communication technology. The radio communication system may include several terminals 11 and several base stations 12.

The terminal 11 may refer to a device that provides voice and/or data connectivity for a user. The terminal 11 may be in communication with one or more core networks via a radio access network (RAN). The terminal 11 may be an Internet of Things terminal, such as a sensor device, a mobile telephone (also called a cellular telephone), or a computer having an Internet of Things terminal, which may be a fixed, portable, pocket, hand-held, built-in, or vehicular apparatus. The terminal may be a station (STA), a subscriber unit, a subscriber station, a mobile station, a mobile, a remote station, an access point, a remote terminal, an access terminal, a user terminal, a user agent, a user device, or user equipment (UE). Alternatively, the terminal 11 may also be a device of an unmanned aerial vehicle. Alternatively, the terminal 11 may also be a vehicular device, which may be, for example, a vehicle computer having a radio communication function, or a radio communication device connected to the vehicle computer. Alternatively, the terminal 11 may also be a roadside device, which may be, for example, a street lamp having a radio communication function, a signal lamp, or other roadside devices.

The base station 12 may be a network side device in the radio communication system. The radio communication system may be a 4th generation mobile communication (4G) system, which is also called a long-term evolution (LTE) system. Alternatively, the radio communication system may also be a 5th generation mobile communication (5G) system, which is also called a new radio (NR) system or a 5G NR system. Alternatively, the radio communication system may also be a system of any generation. An access network in the 5G system may be called a new generation radio access network (NG-RAN) or a manual toll collection (MTC) system.

The base station 12 may be an evolved node B (eNB) used in the 4G system. Alternatively, the base station 12 may also be a next-generation node B (gNB) with a central and distributed framework used in the 5G system. When using the central and distributed framework, the base station 12 generally includes a central unit (CU) and at least two distributed units (DUs). The central unit is provided with protocol stacks of a packet data convergence protocol (PDCP) layer, a radio link control (RLC) layer, and a media access control (MAC) layer. The distributed unit is provided with a protocol stack of a physical (PHY) layer. A specific embodiment of the base station 12 is not limited to the examples of the disclosure.

The base station 12 is in radio connection with the terminal 11 through radio. In different embodiments, the radio is based on a 4G standard, or a 5G standard, such as new radio; alternatively, the radio may also be based on a next-generation mobile communication network technology standard of 5G.

In some examples, an end-to-end (E2E) connection may be further established between the terminals 11, which may be vehicle-to-vehicle (V2V) communication, vehicle-to-infrastructure (V2I) communication, vehicle-to-pedestrian (V2P) communication, etc., in vehicle-to-everything (V2X).

In some examples, the radio communication system may further include a network management device 13.

Several base stations 12 are connected to the network management device 13 separately. The network management device 13 may be a core network device in the radio communication system. For example, the network management device 13 may be a mobility management entity (MME) in an evolved packet core (EPC). Alternatively, the network management device may also be a serving gateway (SGW), a public data network gateway (PGW), a policy and charging rules function (PCRF), a home subscriber server (HSS), or other core network devices. An implementation form of the network management device 13 is not limited to the examples of the disclosure.

The execution entities involved in the examples of the disclosure include, but are not limited to, user equipment (UE) in a cellular mobile communication system, or a base station for cellular mobile communication, etc.

FIG. 2 is a schematic flow diagram of a method for determining service participation according to an example. As shown in FIG. 2, the method for determining service participation of the example is suitable for a UE side and specifically includes the following processing steps.

Step 201, a first network element device obtains associated information about an indicated service of the UE.

The associated information about the indicated service is configured to determine whether the UE is suitable for participating in the indicated service and/or whether the UE is unsuitable for participating in the indicated service. Here, the UE suitable for participating in the indicated service is a UE satisfying an indicated service participation condition, and the UE unsuitable for participating in the indicated service is a UE not satisfying the indicated service participation condition. The indicated service participation condition is that computing power, current channel quality, and other parameters of the UE need to satisfy the setting requirements.

The first network element device may determine, based on the associated information about the indicated service of the UE, indication information associated with the UE suitable for participating in the indicated service, and/or unsuitable for participating in the indicated service. That is, the first network element device may determine the UE suitable for participating in the indicated service and/or the UE unsuitable for participating in the indicated service on the basis of the associated information about the indicated service reported by the UE. In response to determining whether the UE is suitable for participating in the indicated service and/or whether the UE is unsuitable for participating in the indicated service, the associated information about the indicated service of the UE may be transmitted to a second network element device.

As an embodiment, the first network element device may also directly report the associated information about the indicated service reported by the UE to the second network element device. The second network element device may determine whether the UE is suitable for participating in the indicated service and/or whether the UE is unsuitable for participating in the indicated service based on the associated information about the indicated service of the UE.

In an example of the disclosure, the associated information about the indicated service of the UE includes auxiliary information provided by the UE, and the auxiliary information includes at least one of: radio capability information of the UE, computing power information of the UE, or request information that the UE expects to participate in the indicated service or not.

In an example of the disclosure, a first network element device may be a base station, a relay station, a remote radio unit, or another similar device.

As an embodiment, the first network element device may determine whether the UE is capable of participating in the indicated service on the basis of reported radio capability information of the UE.

As an embodiment, the first network element device may determine whether the UE is capable of participating in the indicated service on the basis of auxiliary computing power information of the UE.

As an example, the base station may conduct reporting based on the auxiliary information about whether the UE expects to participate in federated learning and training.

As an embodiment, the first network element device divides the determined user list suitable/unsuitable for the indicated service into a white list and a black list. The time of taking effect may also be additionally set for the white list and the black list. For example, the black list may take effect after 5 minutes and the white list may take effect after 1 minute.

Step 202, the indication information associated with the UE suitable for participating in the indicated service and/or the UE unsuitable for participating in the indicated service is transmitted to the second network element device.

In an example of the disclosure, a second network device may be a core network.

As an embodiment, the step that information of the UE determined as suitable for participating in the indicated service and/or the UE determined as unsuitable for participating in the indicated service is transmitted to the second network element device includes the following step: the first network element device inserts indication information indicating whether the UE is the UE suitable for participating in the indicated service into a resource release message transmitted to the second network element device when the UE releases a radio resource. Alternatively, as another embodiment, information of the UE determined as suitable for participating in the indicated service and/or the UE determined as unsuitable for participating in the indicated service is transmitted to the second network element device in response to determining that the first network element device receives a request transmitted from the second network element device for obtaining information of UE participating in the indicated service. Alternatively, as another embodiment, in response to a transmission period configuration, the first network element device periodically transmits information of the UE determined as suitable for participating in the indicated service and/or the UE determined as unsuitable for participating in the indicated service to the second network element device. Alternatively, as another embodiment, the first network element device detects an indicated event, and in response to detecting the indicated event, information of the UE determined as suitable for participating in the indicated service and/or the UE determined as unsuitable for participating in the indicated service is transmitted to the second network element device.

In an example of the disclosure, in response to determining a user list suitable/unsuitable for the indicated service, the first network element device informs the core network of the user list suitable/unsuitable for the indicated service by transmitting the auxiliary information to the core network. As an example, when the release of UE is conducted, the first network element device informs the core network of whether the UE may be selected as a target user participating in the indicated service by adding auxiliary information to a release message transmitted to the core network. As an example, the first network element device may transmit the auxiliary information to the core network on the basis of the request from the core network, and informs the core network of the user list suitable for the indicated service. As an example, the first network element device may periodically transmit the auxiliary information to the core network based on configuration information about the core network, and inform the core network of the user list suitable for the indicated service. As an example, the base station may detect a designated event of the core network based on a configuration of the core network, and inform the core network of the user list suitable for the indicated service by triggering the transmission of the auxiliary information to the core network in response to detecting the designated event of the core network. As an embodiment, the designated event may be that the number of initiated indicated service requests reaches a preset threshold.

On the basis of the above method for determining service participation, a method for determining service participation according to an example of the disclosure further includes the following step: the first network element device receives information of the UE determined by the second network element device as participating in the indicated service. That is, the second network element device determines whether the UE is suitable for participating in the indicated service on the basis of the UE suitable for participating in the indicated service and/or whether the UE is unsuitable for participating in the indicated service, which are reported by the first network element device, and transmits information of the UE determined as to the first network element device.

In an example, after the first network element device (that is, the base station) receives the indicated service request initiated by the UE, the first network element device may determine whether to make the UE access a current service according to a list of UE capable of participating in the indicated service, the list being transmitted from the core network device (that is, the second network element device), that is, may use the UE, capable of participating in the indicated service, transmitted from the core network device as the UE suitable for participating in the indicated service. Alternatively, the first network element device may jointly determine whether to make the UE having a request to participate in the indicated service access a current indicated service on the basis of a list of UE capable of participating in the indicated service and a list of UE determined to be capable of participating in the indicated service, the lists being transmitted from the core network device. That is to say, the first network element device jointly determines the UE participating in the indicated service by rechecking the determination result of the UE participating in the indicated service, transmitted from the core network device, on the basis of its own determination of the UE participating in the indicated service.

In an example of the disclosure, the first network element device receives an indicated service creation request transmitted from the second network element device, and feeds a service creation success response back to the second network element device in response to determining that UE involved in the indicated service creation request is the UE suitable for participating in the indicated service and is in a connected state, or, feeds a service creation failure response back to the second network element device in response to determining that the UE involved in the indicated service creation request is the UE unsuitable for participating in the indicated service and is in a connected state.

As an embodiment, the first network element device receives an indicated service creation request transmitted from the second network element device, pages, in response to determining that the UE involved in the indicated service creation request is the UE suitable for participating in the indicated service and is in an idle state, the UE, or, transmits a paging failure response to the second network element device in response to determining that the UE involved in the indicated service creation request is the UE unsuitable for participating in the indicated service and is in an idle state.

As an embodiment, the first network element device receives the indicated service creation request transmitted from the second network element device. For the UE in a connected state, in response to determining that the UE initiating the indicated service request is capable of participating in the indicated service, the first network element device creates the indicated service by transmitting the service creation success response to the second network element device. As an embodiment, the first network element device receives the indicated service creation request transmitted from the second network element device. For a UE in a connected state, in response to determining that the UE is incapable of participating in the indicated service, the first network element device transmits the service creation failure response to the second network element device. As an embodiment, the first network element device receives the indicated service creation request transmitted from the second network element device, and for a UE in an idle state, in response to determining that the UE is capable of participating in the indicated service, the first network element device pages the target UE through radio. As an embodiment, the first network element device receives the indicated service creation request transmitted from the second network element device. For the UE in an idle state in the indicated service creation request, in response to determining that the UE is incapable of participating in the indicated service, the first network element device feeds a paging failure response message back to the core network.

For the UE in a connected state, the indicated service creation request initiated by the second network element device carries the indicated service as a creation reason. For example, attribute information about an indicated service type is added in a session of a public data network (PDN), such as a session. For the UE in an idle state, a paging message transmitted from the second network element device to the first network element device carries the indicated service as a paging creation reason.

In an example of the disclosure, the indicated service may be a federated learning service or a peer-to-peer service. Federated learning is a service with significant commercial application potential, yet it still faces considerable challenges. A communication link between all participants, such as a smartphone and a central aggregation server, may be slow or unstable. Any device may participate in federated learning, but some devices may lead to deviation of a federated learning model due to insufficient local computing power (for example, memory shortages) or poor communication links. In this way, training failure of the entire federated model may be caused. In this case, the entire system may inevitably become unstable and unpredictable. Thus, the example of the disclosure only considers a selection of UEs participating in federated learning, thus avoiding training failure of the entire federated learning system. Certainly, the indicated service may also be another collaborative service, and those skilled in the art should understand that as long as the embodiment is the same as or similar to the embodiment of the technical solution of the examples of the disclosure, the embodiment of the specific collaborative service is the same.

FIG. 3 is a schematic flow diagram of a method for determining service participation according to an example. As shown in FIG. 3, the method for determining service participation according to an example of the disclosure includes the following processing steps.

Step 301, a second network element device receives indication information transmitted from a first network element device and associated with UE suitable for participating in an indicated service and/or UE unsuitable for participating in an indicated service.

Step 302, an indicated service request is transmitted to the first network element device according to the indicated service.

The indicated service request includes associated information of the UE determined by the second network element device on the basis of the indication information associated with the UE suitable for participating in the indicated service and/or the UE unsuitable for participating in the indicated service.

The second network element device receives a response message transmitted from the first network element device and responds to the indicated service request, where the response message includes a result of the indicated service. The result of the indicated service shows that the indicated service may be created or not. In response to a service request initiated by a UE unsuitable for the indicated service, a creation failure response is fed back.

In an example of the disclosure, the second network element device transmits reporting indication information of the UE suitable for participating in the indicated service and/or the UE unsuitable for participating in the indicated service to the first network element device, where the reporting indication information includes a reporting period or an event satisfying a reporting condition.

FIG. 4 is a schematic flow diagram of a method for determining service participation according to an example. As shown in FIG. 4, the method for determining service participation according to an example of the disclosure includes the following processing steps.

Step 401, associated information about an indicated service of UE is transmitted to a first network element device.

The associated information about the indicated service is configured to determine whether a UE is suitable for participating in the indicated service and/or unsuitable for participating in the indicated service. The step that associated information about an indicated service of UE is transmitted to a first network element device responds to reporting indication information of the associated information about the indicated service from the first network element device.

The associated information about the indicated service of the UE includes auxiliary information provided by the UE, and the auxiliary information includes at least one of:

radio capability information of the UE, computing power information of the UE, or request information that the UE expects to participate in the indicated service or not.

The UE may determine whether the UE is suitable for participating in the indicated service on the basis of the radio capability information of the UE and/or the computing power information of the UE; and transmit the associated information about the indicated service of the UE to the first network element device in response to determining that the UE is suitable for participating in the indicated service, where the associated information about the indicated service of the UE indicates that the UE is suitable for participating in the indicated service and/or unsuitable for participating in the indicated service.

In an example of the disclosure, in response to determining that the UE receives a reporting indication of the associated information about the indicated service, the reporting indication being transmitted from the first network element device, the UE directly reports the obtained associated information about the indicated service to the first network element device, and alternatively, determines whether the UE is the UE suitable for participating in the indicated service on the basis of the obtained associated information about the indicated service, and reports a determined result to the first network element device.

FIG. 5 is a schematic structural diagram of the composition of an apparatus for determining service participation according to an example. As shown in FIG. 5, the apparatus for determining service participation according to an example of the disclosure is applied to a first network element device and specifically includes an obtaining unit 50 and a transmission unit 51.

The obtaining unit 50 is configured to obtain associated information about an indicated service, where the associated information about the indicated service is configured to determine a UE suitable for participating in the indicated service and/or an UE unsuitable for participating in the indicated service.

The transmission unit 51 is configured to transmit indication information associated with the UE suitable for participating in the indicated service and/or the UE unsuitable for participating in the indicated service to a second network element device.

In some examples, the apparatus includes a determination unit (not shown in the figure) configured to determine, on the basis of the associated information about the indicated service of the UE, the indication information associated with the UE suitable for participating in the indicated service and/or the UE unsuitable for participating in the indicated service.

In some examples, the associated information about the indicated service of the UE includes auxiliary information provided by the UE, and the auxiliary information includes at least one of radio capability information of the UE, computing power information of the UE, or request information that the UE expects to participate in the indicated service or not.

In some examples, the associated information about the indicated service of the UE indicates that the UE is suitable for participating in the indicated service and/or unsuitable for participating in the indicated service, and the transmission unit is further configured to transmit the associated information about the indicated service of the UE to the second network element device.

In some examples, the transmission unit 51 is further configured to insert the indication information associated with the UE suitable for participating in the indicated service and/or the UE unsuitable for participating in the indicated service into a resource release message transmitted to the second network element device when the UE releases a radio resource.

In some examples, the apparatus further includes a first reception unit (not shown in the figure) configured to receive a request transmitted from the second network element device for obtaining information about the UE participating in the indicated service.

The transmission unit 51 is further configured to transmit the indication information associated with the UE determined as suitable for participating in the indicated service and/or the UE determined as unsuitable for participating in the indicated service to the second network element device in response to the request from the second network element device.

In some examples, the transmission unit 51 is further configured to periodically transmit, in response to a transmission period configuration, the indication information associated with the UE determined as suitable for participating in the indicated service and/or the UE determined as unsuitable for participating in the indicated service to the second network element device.

In some examples, the apparatus further includes a detection unit (not shown in the figure) configured to detect an indicated event.

The transmission unit 51 is further configured to transmit, in response to detecting the indicated event, the indication information associated with the UE determined as suitable for participating in the indicated service and/or the UE determined as unsuitable for participating in the indicated service to the second network element device.

In some examples, the apparatus further includes a second reception unit (not shown in the figure) configured to receive information of the UE determined by the second network element device as suitable for participating in the indicated service.

In some examples, the apparatus further includes a third reception unit (not shown in the figure), further configured to receive an indicated service creation request transmitted from the second network element device.

The determination unit is further configured to trigger the transmission unit to feed a service creation success response back to the second network element device in response to determining that the UE involved in the indicated service creation request is the UE suitable for participating in the indicated service and is in a connected state, or, feed a service creation failure response back to the second network element device in response to determining that the UE involved in the indicated service creation request is the UE unsuitable for participating in the indicated service and is in a connected state.

In some examples, the apparatus further includes a fourth reception unit (not shown in the figure), further configured to receive an indicated service creation request transmitted from the second network element device.

The determination unit is further configured to trigger, in response to determining that the UE involved in the indicated service creation request is the UE suitable for participating in the indicated service and is in an idle state, the transmission unit to page the UE, or, transmit a paging failure response to the second network element device in response to determining that the UE involved in the indicated service creation request is the UE unsuitable for participating in the indicated service and is in an idle state.

In some examples, the indicated service includes a federated learning service.

In an example, the obtaining unit 50, the transmission unit 51, the determination unit, the detection unit, the first reception unit, the second reception unit, the third reception unit, the fourth reception unit, etc. may be implemented by one or more of a central processing unit (CPU), a graphics processing unit (GPU), a baseband processor (BP), an application specific integrated circuit (ASIC), a digital signal processor (DSP), a programmable logic device (PLD), a complex programmable logic device (CPLD), a field-programmable gate array (FPGA), a general-purpose processor, a controller, a micro controller unit (MCU), a microprocessor, or other electronic components, or by one or more radio frequency (RF) antennas, thus executing the communication method of the above example.

In an example of the disclosure, a specific operation execution method of each unit of an apparatus for determining service participation shown in FIG. 5 is described in detail in the examples relating to the method, and will not be repeated here.

FIG. 6 is a schematic structural diagram of the composition of an apparatus for determining service participation according to an example. As shown in FIG. 6, the apparatus for determining service participation according to an example of the disclosure is applied to a second network element device and specifically includes a reception unit 60 and a transmission unit 61.

The reception unit 60 is configured to receive indication information transmitted from a first network element device and associated with UE suitable for participating in an indicated service and/or UE unsuitable for participating in an indicated service.

The transmission unit 61 is configured to transmit an indicated service request to the first network element device according to the indicated service.

In some examples, the indicated service request includes associated information of the UE determined by the second network element device on the basis of the indication information associated with the UE suitable for participating in the indicated service and/or the UE unsuitable for participating in the indicated service.

In some examples, the reception unit 60 is further configured to receive a response message transmitted from the first network element device and responding to the indicated service request, where the response message includes a result of the indicated service.

In some examples, the transmission unit 61 is configured to transmit reporting indication information of the UE suitable for participating in the indicated service and/or the UE unsuitable for participating in the indicated service to the first network element device, where the reporting indication information includes a reporting period or an event satisfying a reporting condition.

In an example, the reception unit 60 and the transmission unit 61 may be implemented by one or more of a central processing unit (CPU), a graphics processing unit (GPU), a baseband processor (BP), an application specific integrated circuit (ASIC), a digital signal processor (DSP), a programmable logic device (PLD), a complex programmable logic device (CPLD), a field-programmable gate array (FPGA), a general-purpose processor, a controller, a micro controller unit (MCU), a microprocessor, or other electronic components, or by one or more radio frequency (RF) antennas, thus executing the communication method of the above example.

In an example of the disclosure, a specific operation execution method of each unit of an apparatus for determining service participation shown in FIG. 6 is described in detail in the examples relating to the method, and will not be repeated here.

FIG. 7 is a schematic structural diagram of the composition of an apparatus for determining service participation according to an example. As shown in FIG. 7, the apparatus for determining service participation according to an example of the disclosure is applied to the UE and specifically includes a transmission unit 70.

The transmission unit 70 is configured to transmit associated information about an indicated service of the UE to a first network element device, where the associated information about the indicated service is configured to determine if the UE is suitable for participating in the indicated service and/or if the UE is unsuitable for participating in the indicated service.

In some examples, the transmission unit 70 transmits associated information about an indicated service of the UE to a first network element device in response to reporting indication information of the associated information about the indicated service from the first network element device.

In some examples, the associated information about the indicated service of the UE includes auxiliary information provided by the UE, and the auxiliary information includes at least one of radio capability information of the UE, computing power information of the UE, or request information that the UE expects to participate in the indicated service, or not.

In some examples, the apparatus further includes a determination unit (not shown in the figure) configured to determine whether the UE is suitable for participating in the indicated service on the basis of the radio capability information of the UE and/or the computing power information of the UE.

The transmission unit 70 is further configured to transmit the associated information about the indicated service of the UE to the first network element device in response to determining that the UE is suitable for participating in the indicated service, where the associated information about the indicated service of the UE indicates that the UE is suitable for participating in the indicated service and/or unsuitable for participating in the indicated service.

In an example, the transmission unit 70 and the determination unit may be implemented by one or more of a central processing unit (CPU), a graphics processing unit (GPU), a baseband processor (BP), an application specific integrated circuit (ASIC), a digital signal processor (DSP), a programmable logic device (PLD), a complex programmable logic device (CPLD), a field-programmable gate array (FPGA), a general-purpose processor, a controller, a micro controller unit (MCU), a microprocessor, or other electronic components, or by one or more radio frequency (RF) antennas, thus executing the communication method of the above example.

In an example of the disclosure, a specific operation execution method of each unit of an apparatus for determining service participation shown in FIG. 7 is described in detail in the examples relating to the method, and will not be repeated here.

FIG. 8 is a block diagram of user equipment 8000 according to an example. For example, the user equipment 8000 may be a mobile phone, a computer, digital broadcast user equipment, a messaging device, a game console, a tablet device, a medical device, a fitness device, or a personal digital assistant, etc.

With reference to FIG. 8, the user equipment 8000 may include one or more of the following assemblies: a processing assembly 8002, a memory 8004, a power supply assembly 8006, a multimedia assembly 8008, an audio assembly 8010, an input/output (I/O) interface 8012, a sensor assembly 8014, and a communication assembly 8016.

The processing assembly 8002 generally controls the overall operations of the user equipment 8000, such as operations associated with display, telephone calls, data communication, camera operations, and recording operations. The processing assembly 8002 may include one or more processors 8020 for executing an instruction, so as to complete all or some steps of the method. In addition, the processing assembly 8002 may include one or more modules to facilitate interaction between the processing assembly 8002 and other assemblies. For example, the processing assembly 8002 may include a multimedia module to facilitate interaction between the multimedia assembly 8008 and the processing assembly 8002.

The memory 8004 is configured to store various types of data to support the operations on the equipment 8000. Examples of the data include an instruction for any application or method operating on the user equipment 8000, contact data, phone book data, a message, a picture, or a video, etc. The memory 8004 may be implemented by any type of volatile or nonvolatile memory device or their combination, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk, or an optical disk.

The power supply assembly 8006 supplies power to various assemblies of the user equipment 8000. The power supply assembly 8006 may include a power management system, one or more power supplies, and other assemblies associated with generating, managing, and distributing power for the user equipment 8000.

The multimedia assembly 8008 includes a screen that provides an output interface between the user equipment 8000 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, slide, and gestures on the touch panel. The touch sensor may sense a boundary of a touching or sliding operation, and further measure a duration and pressure related to the touching or sliding operation. In some examples, the multimedia assembly 8008 includes a front-facing camera and/or a rear-facing camera. When the equipment 8000 is in an operation mode, such as a photographing mode or a video mode, the front-facing camera and/or the rear-facing camera are/is capable of receiving external multimedia data. Each of the front-facing camera and the rear-facing camera may be a fixed optical lens system or have a focal length and optical zoom capability.

The audio assembly 8010 is configured to output and/or input an audio signal. For example, the audio assembly 8010 includes a microphone (MIC). The MIC is configured to receive an external audio signal when the user equipment 8000 is in the operation mode, for example, a calling mode, a recording mode, and a speech identification mode. The received audio signal may be further stored in the memory 8004 or transmitted via the communication assembly 8016. In some examples, the audio assembly 8010 further includes a speaker for outputting an audio signal.

The I/O interface 8012 provides an interface between the processing assembly 8002 and a peripheral interface module. The peripheral interface module may be a keyboard, a click wheel, or a button, etc. The buttons may include, but are not limited to, a home button, a volume button, a start button, and a lock button.

The sensor assembly 8014 includes one or more sensors for providing state assessments of various aspects for the user equipment 8000. For example, the sensor assembly 8014 is capable of detecting an on/off state of the equipment 8000 and relative positioning of the assemblies, such as a display and a keypad of the user equipment 8000. The sensor assembly 8014 is further capable of detecting position change of the user equipment 8000 or an assembly of the user equipment 8000, presence or absence of contact between the user and the user equipment 8000, an orientation or acceleration/deceleration of the user equipment 8000, and temperature change of the user equipment 8000. The sensor assembly 8014 may include a proximity sensor configured to detect the presence of a nearby object without any physical contact. The sensor assembly 8014 may further include an optical sensor, such as a complementary metal-oxide-semiconductor (CMOS) or charge-coupled device (CCD) image sensor, which is used in an imaging application. In some examples, the sensor assembly 8014 may further include an acceleration sensor, a gyroscope sensor, a magnetic sensor, a pressure sensor, or a temperature sensor.

The communication assembly 8016 is configured to facilitate wired or radio communication between the user equipment 8000 and other devices. The user equipment 8000 may access a radio network on the basis of a communication standard, such as WiFi, the 2nd generation mobile communication technology (2G), or the 3rd generation mobile communication technology (3G), or their combination. In an example, the communication assembly 8016 receives a broadcast signal or broadcast-related information from an external broadcast management system via a broadcast channel. In an example, the communication assembly 8016 further includes a near field communication (NFC) module to facilitate short-range communication. For example, the NFC module may be implemented on the basis of a radio frequency identification (RFID) technology, an infrared data association (IrDA) technology, an ultra wide band (UWB) technology, a Bluetooth (BT) technology, or other technologies.

For example, the user equipment 8000 may be implemented using one or more of an ASIC, DSP, a digital signal processing device (DSPD), PLD, FPGA, a controller, a microcontroller unit, a microprocessor, or other electronic components, thereby executing the above method for determining service participation.

In an example, there is further provided a non-transitory computer-readable storage medium including an instruction, for example, the memory 8004 including an instruction. The instruction may be executed by the processor 8020 of the user equipment 8000 so as to complete the above method for determining service participation. For example, the non-transitory computer-readable storage medium may be a ROM, a random access memory (RAM), a compact disc read-only memory (CD-ROM), a magnetic tape, a floppy disk, an optical data storage device, etc.

An example of the disclosure further provides a network element device. The network element device includes a processor, a transceiver, a memory, and an executable program stored in the memory and runnable by the processor, where the processor executes the steps of the method for determining service participation of the above example when running the executable program. The network element device may be the first network element device or the second network element device in the above examples.

An example of the disclosure further provides user equipment. The user equipment includes a processor, a transceiver, a memory, and an executable program stored in the memory and runnable by the processor, where the processor executes the steps of the method for determining service participation of the above example when running the executable program.

An example of the disclosure further provides a storage medium. The storage medium stores an executable program, which, when executed by a processor, executes the steps of the method for determining service participation as described in the above example.

Additional non-limiting embodiments of the disclosure include the following.

1. A method for determining service participation, including: obtaining, by a first network element device, associated information about an indicated service of user equipment (UE), the associated information about the indicated service is configured to determine UE suitable for participating in the indicated service and/or UE unsuitable for participating in the indicated service; and transmitting indication information associated with the UE suitable for participating in the indicated service and/or the UE unsuitable for participating in the indicated service to a second network element device.

2. The method according to embodiment 1, including: determining, based on the associated information about the indicated service of the UE, the indication information associated with the UE suitable for participating in the indicated service and/or the UE unsuitable for participating in the indicated service.

3. The method according to embodiment 2, the associated information about the indicated service of the UE comprises auxiliary information provided by the UE; and the auxiliary information comprises at least one of: radio capability information of the UE, computing power information of the UE, or request information that the UE expects to participate in the indicated service or not.

4. The method according to embodiment 1, the associated information about the indicated service of the UE indicates that the UE is suitable for participating in the indicated service and/or unsuitable for participating in the indicated service, and the transmitting indication information associated with the UE suitable for participating in the indicated service and/or the UE unsuitable for participating in the indicated service to a second network element device comprises: transmitting the associated information about the indicated service of the UE to the second network element device.

5. The method according to embodiment 1, transmitting indication information associated with the UE suitable for participating in the indicated service and/or the UE unsuitable for participating in the indicated service to a second network element device, comprises inserting, by the first network element device, the indication information associated with the UE suitable for participating in the indicated service and/or the UE unsuitable for participating in the indicated service into a resource release message transmitted to the second network element device when the UE releases a radio resource.

6. The method according to embodiment 1, transmitting indication information associated with the UE suitable for participating in the indicated service and/or the UE unsuitable for participating in the indicated service to a second network element device, comprises: transmitting the indication information associated with the UE determined as suitable for participating in the indicated service and/or the UE determined as unsuitable for participating in the indicated service to the second network element device in response to determining that the first network element device receives a request transmitted from the second network element device for obtaining information of the UE participating in the indicated service.

7. The method according to embodiment 1, transmitting indication information associated with the UE suitable for participating in the indicated service and/or the UE unsuitable for participating in the indicated service to a second network element device, comprises: in response to a transmission period configuration, periodically transmitting, by the first network element device, the indication information associated with the UE determined as suitable for participating in the indicated service and/or the UE determined as unsuitable for participating in the indicated service to the second network element device.

8. The method according to embodiment 1, transmitting indication information associated with the UE suitable for participating in the indicated service and/or the UE unsuitable for participating in the indicated service to a second network element device, comprises: detecting an indicated event by the first network element device, and transmitting, in response to detecting the indicated event, the indication information associated with the UE determined as suitable for participating in the indicated service and/or the UE determined as unsuitable for participating in the indicated service to the second network element device.

9. The method according to any one of the embodiments 1-8, further including: receiving, by the first network element device, information of the UE determined by the second network element device as suitable for participating in the indicated service.

10. The method according to embodiment 9, further including: receiving, by the first network element device, an indicated service creation request transmitted from the second network element device, feeding a service creation success response back to the second network element device in response to determining that the UE involved in the indicated service creation request is the UE suitable for participating in the indicated service and is in a connected state, or, feeding a service creation failure response back to the second network element device in response to determining that the UE involved in the indicated service creation request is the UE unsuitable for participating in the indicated service and is in a connected state.

11. The method according to embodiment 9, further including: receiving, by the first network element device, an indicated service creation request transmitted from the second network element device, paging, in response to determining that the UE involved in the indicated service creation request is the UE suitable for participating in the indicated service and is in an idle state, the UE, or, transmitting a paging failure response to the second network element device in response to determining that the UE involved in the indicated service creation request is the UE unsuitable for participating in the indicated service and is in an idle state.

12. The method according to embodiment 9, wherein the indicated service comprises a federated learning service.

13. A method for determining service participation, including: receiving, by a second network element device, indication information transmitted from a first network element device and associated with UE suitable for participating in an indicated service and/or UE unsuitable for participating in an indicated service; and transmitting an indicated service request to the first network element device according to the indicated service.

14. The method according to embodiment 13, the indicated service request comprises associated information of the UE determined by the second network element device based on the indication information associated with the UE suitable for participating in the indicated service and/or the UE unsuitable for participating in the indicated service.

15. The method according to embodiment 13, further including: receiving a response message transmitted from the first network element device and responding to the indicated service request, the response message comprises a result of the indicated service.

16. The method according to embodiment 14, further including: transmitting, by the second network element device, reporting indication information of the UE suitable for participating in the indicated service and/or the UE unsuitable for participating in the indicated service to the first network element device, the reporting indication information comprises a reporting period or an event satisfying a reporting condition.

17. A method for determining service participation, performed by the UE and including: transmitting associated information about an indicated service of the UE to a first network element device, the associated information about the indicated service is configured to determine UE suitable for participating in the indicated service and/or UE unsuitable for participating in the indicated service.

18. The method according to embodiment 17, transmitting associated information about an indicated service of the UE to a first network element device, in response to reporting indication information of the associated information about the indicated service from the first network element device.

19. The method according to embodiment 17, the associated information about the indicated service of the UE comprises auxiliary information provided by the UE; and the auxiliary information comprises at least one of: radio capability information of the UE, computing power information of the UE, or request information that the UE expects to participate in the indicated service or not.

20. The method according to embodiment 19, further including: determining whether the UE is suitable for participating in the indicated service based on the radio capability information of the UE and/or the computing power information of the UE; and transmitting the associated information about the indicated service of the UE to the first network element device in response to determining that the UE is suitable for participating in the indicated service, the associated information about the indicated service of the UE indicates that the UE is suitable for participating in the indicated service and/or unsuitable for participating in the indicated service.

21. An apparatus for determining service participation, applied to a first network element device and including: an obtaining unit configured to obtain associated information about an indicated service, the associated information about the indicated service is configured to determine a UE suitable for participating in the indicated service and/or a UE unsuitable for participating in the indicated service; and a transmission unit configured to transmit indication information associated with the UE suitable for participating in the indicated service and/or the UE unsuitable for participating in the indicated service to a second network element device.

22. The apparatus according to embodiment 21, including: a determination unit configured to determine, based on the associated information about the indicated service of the UE, the indication information associated with the UE suitable for participating in the indicated service and/or the UE unsuitable for participating in the indicated service.

23. The apparatus according to embodiment 22, the associated information about the indicated service of the UE comprises auxiliary information provided by the UE; and the auxiliary information comprises at least one of: radio capability information of the UE, computing power information of the UE, or request information that the UE expects to participate in the indicated service or not.

24. The apparatus according to embodiment 21, the associated information about the indicated service of the UE indicates that the UE is suitable for participating in the indicated service and/or unsuitable for participating in the indicated service, and the transmission unit is further configured to transmit the associated information about the indicated service of the UE to the second network element device.

25. The apparatus according to embodiment 21, the transmission unit is further configured to: insert the indication information associated with the UE suitable for participating in the indicated service and/or the UE unsuitable for participating in the indicated service into a resource release message transmitted to the second network element device when the UE releases a radio resource.

26. The apparatus according to embodiment 21, further including: a first reception unit configured to receive a request transmitted from the second network element device for obtaining information of the UE participating in the indicated service, wherein the transmission unit is further configured to transmit the indication information associated with the UE determined as suitable for participating in the indicated service and/or the UE determined as unsuitable for participating in the indicated service to the second network element device in response to the request from the second network element device.

27. The apparatus according to embodiment 21, the transmission unit is further configured to periodically transmit, in response to a transmission period configuration, the indication information associated with the UE determined as suitable for participating in the indicated service and/or the UE determined as unsuitable for participating in the indicated service to the second network element device.

28. The apparatus according to embodiment 21, further including: a detection unit configured to detect an indicated event, wherein the transmission unit is further configured to transmit, in response to detecting the indicated event, the indication information associated with the UE determined as suitable for participating in the indicated service and/or the UE determined as unsuitable for participating in the indicated service to the second network element device.

29. The apparatus according to any one of embodiments 22-28, further including: a second reception unit configured to receive information of the UE determined by the second network element device as suitable for participating in the indicated service.

30. The apparatus according to embodiment 29, further including: a third reception unit further configured to receive an indicated service creation request transmitted from the second network element device, wherein the determination unit is further configured to trigger the transmission unit to feed a service creation success response back to the second network element device in response to determining that the UE involved in the indicated service creation request is the UE suitable for participating in the indicated service and is in a connected state, or, feed a service creation failure response back to the second network element device in response to determining that the UE involved in the indicated service creation request is the UE unsuitable for participating in the indicated service and is in a connected state.

31. The apparatus according to embodiment 29, further including: a fourth reception unit further configured to receive an indicated service creation request transmitted from the second network element device, wherein the determination unit is further configured to trigger, in response to determining that the UE involved in the indicated service creation request is the UE suitable for participating in the indicated service and is in an idle state, the transmission unit to page the UE, or, transmit a paging failure response to the second network element device in response to determining that the UE involved in the indicated service creation request is the UE unsuitable for participating in the indicated service and is in an idle state.

32. The apparatus according to embodiment 29, wherein the indicated service comprises a federated learning service.

33. An apparatus for determining service participation, including: a reception unit configured to receive indication information transmitted from a first network element device and associated with UE suitable for participating in an indicated service and/or UE unsuitable for participating in an indicated service; and a transmission unit configured to transmit an indicated service request to the first network element device according to the indicated service.

34. The apparatus according to embodiment 33, the indicated service request comprises associated information of the UE determined by the second network element device based on the indication information associated with the UE suitable for participating in the indicated service and/or the UE unsuitable for participating in the indicated service.

35. The apparatus according to embodiment 33, the reception unit is further configured to: receive a response message transmitted from the first network element device and responding to the indicated service request; the response message comprises a result of the indicated service.

36. The apparatus according to embodiment 34, the transmission unit is configured to: transmit reporting indication information of the UE suitable for participating in the indicated service and/or the UE unsuitable for participating in the indicated service to the first network element device, wherein the reporting indication information comprises a reporting period or an event satisfying a reporting condition.

37. An apparatus for determining service participation, applied to the UE and including: a transmission unit configured to transmit associated information about an indicated service of the UE to a first network element device, the associated information about the indicated service is configured to determine UE suitable for participating in the indicated service and/or UE unsuitable for participating in the indicated service.

38. The apparatus according to embodiment 37, the transmission unit transmits the associated information about the indicated service of the UE to the first network element device in response to reporting indication information of the associated information about the indicated service from the first network element device.

39. The apparatus according to embodiment 37, the associated information about the indicated service of the UE comprises auxiliary information provided by the UE; and the auxiliary information comprises at least one of: radio capability information of the UE, computing power information of the UE, or request information that the UE expects to participate in the indicated service or not.

40. The apparatus according to embodiment 39, further including: a determination unit configured to determine whether the UE is suitable for participating in the indicated service based on the radio capability information of the UE and/or the computing power information of the UE, wherein the transmission unit is further configured to transmit the associated information about the indicated service of the UE to the first network element device in response to determining that the UE is suitable for participating in the indicated service, the associated information about the indicated service of the UE indicates that the UE is suitable for participating in the indicated service and/or unsuitable for participating in the indicated service.

41. A network element device, including a processor, a transceiver, a memory, and an executable program stored in the memory and runnable by the processor, and the processor executes steps of the method for determining service participation according to any one of embodiments 1-12 when running the executable program.

42. A network element device, including a processor, a transceiver, a memory, and an executable program stored in the memory and runnable by the processor, and the processor executes steps of the method for determining service participation according to any one of embodiments 13-16 when running the executable program.

43. A user equipment, including a processor, a transceiver, a memory, and an executable program stored in the memory and runnable by the processor, wherein the processor executes steps of the method for determining service participation according to any one of embodiments 17-20 when running the executable program.

44. A non-transitory computer-readable storage medium, storing an executable program, the executable program executes steps of the method for determining service participation according to any one of embodiments 1-20 when being executed by a processor.

Those skilled in the art could easily conceive of other implementation solutions of the examples of the disclosure upon consideration of the description and practice of the invention disclosed here. The present application is intended to cover any variations, uses, or adaptive changes of the examples of the disclosure, and these variations, uses, or adaptive changes follow the general principles of the examples of the disclosure and include common general knowledge or conventional technical means that are not disclosed in the examples of the disclosure. The description and the examples are to be regarded as illustrative only, and the true scope and spirit of the examples of the disclosure are indicated by the following claims.

It is to be understood that the examples of the disclosure are not limited to precise structures described above and shown in the accompanying drawings, and can have various modifications and changes without departing from the scope of the examples. The scope of the examples of the disclosure is limited by the appended claims only.

What is claimed is:

1. A method for determining service participation, comprising:

obtaining, by a first network element device, associated information about an indicated service of user equipment (UE), wherein the associated information about the indicated service is configured to determine UE suitable for participating in the indicated service and/or UE unsuitable for participating in the indicated service, computing power and current channel quality of the UE suitable for participating in the indicated service satisfy setting requirements, and at least one of computing power or current channel quality of the UE unsuitable for participating in the indicated service does not satisfy the setting requirements; and transmitting indication information associated with the UE suitable for participating in the indicated service and/or the UE unsuitable for participating in the indicated service to a second network element device, wherein the indicated service comprises a federated learning service, and wherein transmitting the indication information associated with the UE suitable for participating in the indicated service and/or the UE unsuitable for participating in the indicated service to the second network element device comprises:

inserting, by the first network element device, the indication information associated with the UE suitable for participating in the indicated service and/or the UE unsuitable for participating in the indicated service into a resource release message transmitted to the second network element device in a case where the UE releases a radio resource.

2. The method according to claim 1, comprising:

determining, based on the associated information about the indicated service of the UE, the indication information associated with the UE suitable for participating in the indicated service and/or the UE unsuitable for participating in the indicated service.

3. The method according to claim 2, wherein the associated information about the indicated service of the UE comprises auxiliary information provided by the UE; and the auxiliary information comprises at least one of:

radio capability information of the UE, computing power information of the UE, or request information that the UE expects to participate in the indicated service or not.

4. The method according to claim 1, wherein:

the associated information about the indicated service of the UE indicates that the UE is suitable for participating in the indicated service and/or unsuitable for participating in the indicated service, and transmitting the indication information associated with the UE suitable for participating in the indicated service and/or the UE unsuitable for participating in the indicated service to the second network element device comprises:

transmitting the associated information about the indicated service of the UE to the second network element device.

5. The method according to claim 1, wherein transmitting the indication information associated with the UE suitable for participating in the indicated service and/or the UE unsuitable for participating in the indicated service to the second network element device further comprises at least one of:

transmitting the indication information associated with the UE determined as suitable for participating in the indicated service and/or the UE determined as unsuitable for participating in the indicated service to the second network element device in response to determining that the first network element device receives a request transmitted from the second network element device for obtaining information of UE participating in the indicated service;

in response to a transmission period configuration, periodically transmitting, by the first network element device, the indication information associated with the UE determined as suitable for participating in the indicated service and/or the UE determined as unsuitable for participating in the indicated service to the second network element device; or, detecting an indicated event by the first network element device, and transmitting, in response to detecting the indicated event, the indication information associated with the UE determined as suitable for participating in the indicated service and/or the UE determined as unsuitable for participating in the indicated service to the second network element device.

6. The method according to claim 1, further comprising:

receiving, by the first network element device, information of the UE determined by the second network element device as suitable for participating in the indicated service.

7. The method according to claim 6, further comprising:

receiving, by the first network element device, an indicated service creation request transmitted from the second network element device, feeding a service creation success response back to the second network element device in response to determining that UE involved in the indicated service creation request is the UE suitable for participating in the indicated service and is in a connected state, or, feeding a service creation failure response back to the second network element device in response to determining that UE involved in the indicated service creation request is the UE unsuitable for participating in the indicated service and is in a connected state.

8. The method according to claim 6, further comprising:

receiving, by the first network element device, an indicated service creation request transmitted from the second network element device, paging, in response to determining that UE involved in the indicated service creation request is the UE suitable for participating in the indicated service and is in an idle state, the UE, or, transmitting a paging failure response to the second network element device in response to determining that UE involved in the indicated service creation request is the UE unsuitable for participating in the indicated service and is in an idle state.

9. The method according to claim 1, wherein the indication information is configured to enable the second network element device to determine the UE suitable for participating in the indicated service.

10. A network element device, comprising a processor, a transceiver, a memory, and an executable program stored in the memory and runnable by the processor, wherein the processor executes steps of the method for determining service participation according to claim 1 when running the executable program.

11. A method for determining service participation, comprising:

receiving, by a second network element device, indication information transmitted from a first network element device and associated with user equipment (UE) suitable for participating in an indicated service and/or UE unsuitable for participating in an indicated service, wherein the indication information is inserted by the first network element device into a resource release message transmitted to the second network element device in a case where the UE releases a radio resource, computing power and current channel quality of the UE suitable for participating in the indicated service satisfy setting requirements, and at least one of computing power or current channel quality of the UE unsuitable for participating in the indicated service does not satisfy the setting requirements; and transmitting an indicated service request to the first network element device according to the indicated service, and wherein the indicated service comprises a federated learning service.

12. The method according to claim 11, wherein the indicated service request comprises associated information of UE determined by the second network element device based on the indication information associated with the UE suitable for participating in the indicated service and/or the UE unsuitable for participating in the indicated service.

13. The method according to claim 12, further comprising:

transmitting, by the second network element device, reporting indication information of the UE suitable for participating in the indicated service and/or the UE unsuitable for participating in the indicated service to the first network element device, wherein the reporting the indication information comprises a reporting period or an event satisfying a reporting condition.

14. The method according to claim 11, further comprising:

receiving a response message transmitted from the first network element device and responding to the indicated service request, wherein the response message comprises a result of the indicated service.

15. A network element device, comprising a processor, a transceiver, a memory, and an executable program stored in the memory and runnable by the processor, wherein the processor executes steps of the method for determining service participation according to claim 11 when running the executable program.

16. A method for determining service participation, performed by user equipment (UE) and comprising:

transmitting associated information about an indicated service of the UE to a first network element device, wherein the associated information about the indicated service is configured to determine UE suitable for participating in the indicated service and/or UE unsuitable for participating in the indicated service, and indication information is associated with the UE suitable for participating in the indicated service and/or the UE unsuitable for participating in the indicated service and transmitted from the first network element device, computing power and current channel quality of the UE suitable for participating in the indicated service satisfy setting requirements, and at least one of computing power or current channel quality of the UE unsuitable for participating in the indicated service does not satisfy the setting requirements, and wherein the indicated service comprises a federated learning service, and the indication information is inserted by the first network element device into a resource release message transmitted to a second network element device in a case where the UE releases a radio resource.

17. The method according to claim 16, wherein transmitting associated information about the indicated service of the UE to the first network element device responds to reporting indication information of the associated information about the indicated service from the first network element device.

18. The method according to claim 16, wherein the associated information about the indicated service of the UE comprises auxiliary information provided by the UE; and the auxiliary information comprises at least one of:

radio capability information of the UE, computing power information of the UE, or request information that the UE expects to participate in the indicated service or not.

19. The method according to claim 18, further comprising:

determining whether the UE is suitable for participating in the indicated service based on the radio capability information of the UE and/or the computing power information of the UE; and transmitting the associated information about the indicated service of the UE to the first network element device in response to determining that the UE is suitable for participating in the indicated service, wherein the associated information about the indicated service of the UE indicates that the UE is suitable for participating in the indicated service.

20. A user equipment, comprising a processor, a transceiver, a memory, and an executable program stored in the memory and runnable by the processor, wherein the processor executes steps of the method for determining service participation according to claim 16 when running the executable program.

* * * * *